(12) United States Patent
Yanagida et al.

(10) Patent No.: US 6,287,374 B1
(45) Date of Patent: Sep. 11, 2001

(54) PIGMENT AND PROCESS FOR PRODUCING THE SAME, WATER BASE INK AND PROCESS FOR PRODUCING THE SAME

(75) Inventors: Shozo Yanagida, 10-13, 2-chome, Uguisudai, Kawanishi-shi, Hyogo-Ken, 666-0133; Yuji Wada, Toyonaka; Miwa Saito, Kameoka; Takamasa Ueda, Ibaraki; Izumi Osawa, Ikeda, all of (JP)

(73) Assignees: Shozo Yanagida, Hyogo-ken; Minolta Co., Ltd., Osaka, both of (JP)

( * ) Notice: Subject to any disclaimer, the term of this patent is extended or adjusted under 35 U.S.C. 154(b) by 0 days.

(21) Appl. No.: 09/392,654

(22) Filed: Sep. 9, 1999

Related U.S. Application Data
(60) Provisional application No. 60/127,265, filed on Mar. 31, 1999.

(30) Foreign Application Priority Data

Sep. 11, 1998 (JP) .................................................. 10-257406
Mar. 1, 1999 (JP) .................................................. 11-052332

(51) Int. Cl.$^7$ .................................................. C09D 11/00
(52) U.S. Cl. .......................... 106/31.9; 106/476; 106/478
(58) Field of Search .................................. 106/31.9, 476, 106/478

(56) References Cited

U.S. PATENT DOCUMENTS

| | | | |
|---|---|---|---|
| 4,478,643 | * 10/1984 | Kuwahara et al. | 106/410 |
| 4,867,573 | 9/1989 | Tsutsui et al. | 366/114 |
| 5,554,739 | 9/1996 | Belmont | 534/885 |
| 5,788,758 | * 8/1998 | Sawada et al. | 106/493 |
| 5,830,818 | * 11/1998 | Bruns et al. | 501/141 |
| 5,837,045 | * 11/1998 | Johnson et al. | 106/31.85 |
| 6,031,100 | * 2/2000 | Badejo | 546/49 |
| 6,045,609 | * 4/2000 | Guillaumon et al. | 106/425 |

FOREIGN PATENT DOCUMENTS

| | | |
|---|---|---|
| 0 452 711 | 10/1991 | (EP) . |
| 0 905 199 | 3/1999 | (EP) . |
| 08319444 | 3/1996 | (JP) . |

* cited by examiner

*Primary Examiner*—C. Melissa Koslow
*Assistant Examiner*—Veronica F. Faison
(74) *Attorney, Agent, or Firm*—McDermott, Will & Emery

(57) ABSTRACT

In the present invention, a pigment is irradiated with a microwave so as to improve a surface thereof. Further, letting A be an area of a portion having hydrophilic groups on a surface of the pigment and B be an area of the other portion thereon, which are respectively found by measuring infrared spectrometers of the pigment, a ratio (A/B) is not less than 4. Water base ink according to the present invention is obtained by dispersing such a pigment in an aqueous medium.

17 Claims, No Drawings

PIGMENT AND PROCESS FOR PRODUCING THE SAME, WATER BASE INK AND PROCESS FOR PRODUCING THE SAME

This application claims priority to U.S. Provisional Patent Application Serial No. 60/127,265, filed Mar. 31, 1999.

BACKGROUND OF THE INVENTION

This application based on application Nos. 257406/1998 and 52332/1999 filed in Japan, the contents of which is hereby incorporated by reference.

1. Field of the Invention

The present invention relates to a pigment used in ink and the like and a process for producing the same, as well as water base ink using such a pigment and a process for producing the same. In particular, the present invention is characterized in that it enables easy improvement of dispersion stability of the pigment in an aqueous medium.

2. Description of the Prior Art

As ink for ink recording apparatus such as an inkjet printer, water base ink, in addition to oil base ink, has been conventionally used from the viewpoint of easiness of handling and safety.

The water base ink widely used in the art generally employs a water-soluble dye as a colorant which is dissolved in an aqueous medium.

However, the water base ink using a water-soluble dye has poor water resistance. Accordingly, there have been problems that, when supplied to a recording medium such as a plain paper sheet for image production, the ink produces blurring called bleeding or feathering and that the ink is caused to run by water contacting therewith.

On this account, the recent studies focus on using a pigment such as carbon black as a colorant for ink, and using water base ink in which the pigment such as carbon black are dispersed in an aqueous medium.

However, the pigment such as carbon black generally presents poor dispersion stability in an aqueous medium. Accordingly, when the water base ink is used in an ink recording apparatus such as an inkjet printer, there are some problems. For example, the pigment such as carbon black in the water base ink gradually forms agglomeration, which clogs a nozzle of the ink recording apparatus, resulting in reduced ink ejection stability. This leads to unstable image production or variations in the image density. As a result, stable production of favorable images is not ensured.

Therefore, in order to improve dispersion stability of the pigment such as carbon black in water base ink, adding a dispersing agent to the water base ink has been conventionally attempted. Examples of such a dispersing agent include a polyvalent alcohol alkyl ether derivative such as triethylene glycol monobutyl ether or a polyvalent alcohol ester derivative such as glyceryl monoacetate, and so on.

However, when any one of the above-mentioned dispersing agents is added to the water base ink in excess, the ink becomes liable to clog a nozzle of the ink recording apparatus by this dispersing agent, resulting in reduced ink ejection stability. Further, the excessive addition of the dispersing agent to the ink also leads to a reduced pigment concentration in the ink. This results in lowered image densities.

In recent years, a method has been proposed aiming at an improvement of dispersion stability of carbon black in an aqueous medium by oxidizing the carbon black with a hypohalogenous acid salt, as disclosed in Japanese Patent Laid-Open No. 319444/1996. Also, a method has been proposed aiming at an improvement of dispersion stability of carbon black in an aqueous medium by chemically binding hydrophilic groups such as $—C_6H_5COOH$, $—C_6H_5SO_3H$ on a surface of the carbon black by a diazonium salt, as disclosed in U.S. Pat. No. 5,554,739.

However, in the method disclosed in Japanese Patent Laid-Open No. 319444/1996, the treatment therein takes a very long time because, in order to oxidize the carbon black with the hypohalogenous acid salt as mentioned above, the aqueous medium, the carbon black and the hypohalogenous acid are mixed and heated to effect oxidation of the carbon black. Similarly, in the method disclosed in U.S. Pat. No. 5,554,739, the reaction steps in chemically binding the above-mentioned hydrophilic groups on the surface of the carbon black are complicated and take a long time. Thus, in both cases, the problem remains that treatments of the carbon black take long time and it is impossible to sufficiently improve the dispersion stability of the carbon black in the aqueous medium within a short time.

SUMMARY OF THE INVENTION

An object of the present invention is to enable easy improvement of dispersion stability of a pigment such as carbon black in an aqueous medium by modifying the pigment.

Another object of the present invention is to prevent water base ink containing a pigment dispersed in an aqueous medium from clogging the nozzle of the ink recording apparatus such as an inkjet printer when used therewith so that the ink is stably ejected from the nozzle of the ink recording apparatus thereby ensuring the stable production of favorable images.

In a pigment and a process for producing the same according to the present invention, the pigment is irradiated with a microwave.

If the pigment is irradiated with a microwave as described above, a surface of the pigment is modified to allow improvement in dispersion stability of the pigment in an aqueous medium.

In irradiating a microwave to the pigment to modify the surface thereof as described above, it is preferable that a power output of the microwave is in the range of 200 to 1000 W and preferably 500 to 1000 W. Further, it is preferable that the microwave is irradiated for 10 seconds to 100 minutes, preferably 1 minute to 30 minutes, and more preferably 1 minute to 10 minutes.

Further, in the pigment according to the present invention, letting A be an area of a portion having hydrophilic groups on a surface of the pigment and B be an area of the other portion thereon, which are respectively found by measuring infrared spectrometers of the pigment, a ratio (A/B) is not less than 4. The pigment is irradiated with the microwave in the above-mentioned manner in order to set the ratio (A/B) not less than 4.

When the ratio (A/B) is not less than 4, the pigment is stably dispersed in an aqueous medium. Particularly, when the ratio (A/B) is not less than 5, the dispersion stability of the pigment in an aqueous medium is further improved.

Further, in the water base ink according to the present invention, a pigment which is irradiated with the microwave and/or in which a ratio (A/B) is not less than 4 letting A be an area of a portion having hydrophilic groups on a surface of the pigment and B be an area of the other portion thereon, which are respectively found by measuring infrared spectrometers of the pigment, is dispersed in an aqueous medium.

In producing the water base ink by dispersing the pigment irradiated with a microwave in an aqueous medium, the pigment may be irradiated with the microwave and then dispersed in the aqueous medium. It is also possible that the pigment is added to an aqueous medium first and the aqueous medium to which the pigment is added is irradiated with the microwave.

When the pigment irradiated with the microwave or the pigment in which a ratio (A/B) is not less than 4 letting A be an area of a portion having hydrophilic groups on a surface of the pigment and B be an area of the other portion thereon, which are respectively found by measuring infrared spectrometers of the pigment is used, the pigment is stably dispersed in the aqueous medium.

Accordingly, in the water base ink having such pigment dispersed in an aqueous medium, the pigment is prevented from forming agglomeration in the aqueous medium. When such water base ink is used in an ink recording apparatus such as an inkjet printer, the clogging of the nozzle of the ink recording apparatus is prevented, whereby ejection stability of the ink is improved and stable recording of good quality becomes possible.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Now, a specific description will be made on embodiments of the present invention.

As the pigment for use in the present invention, a generally known inorganic pigment and organic pigment can be applied.

Examples of such an inorganic pigment include carbon black, titanium oxide, iron oxide, calcium carbonate, alumina white, and so on.

On the other hand, examples of such an organic pigment include azo-pigments such as azo-lakes, insoluble azo-pigments, condensed azo-pigments, and chelate azo-pigments; polycyclic pigments such as phthalocyanine pigments, perylene pigments, anthraquinone pigments, quinacridone pigments, dioxane pigments, thio-indigo pigments, isoindolinone pigments, and quinophthalonine pigments; dye lakes such as basic dye-type lakes, and acidic dye-type lakes as well as nitro-pigments, nitroso-pigments, aniline black, and so on.

Examples of the organic pigment further include C. I. Pigment Yellow 1 (Dainichi Fast Yellow G: manufactured by Dainichi Seika Kogyo), C. I. Pigment Yellow 10 (Sanyo Fast Yellow R: manufactured by Sanyo Shikiso), C. I. Pigment Yellow 14 (Sumitomo Yellow G, manufactured by Sumitomo Chemical), C. I. Pigment Yellow 17 (Simular Fast Yellow 8GR: manufactured by Dainippon Ink Chemical), C. I. Pigment Red 1 (Sanyo Signal Red: manufactured by Sanyo Shikiso), C. I. Pigment Red 4 (Dainichi Permanent Red RX: manufactured by Dainichi Seika Kogyo), C. I. Pigment Red 49 (Simular Lake Red R: manufactured by Dainippon Ink Chemical), C. I. Pigment Blue 1 (Simulex Blue BOF: manufactured by Dainippon Ink Chemical), C. I. Pigment Blue 2 (Simulex Blue 16F: manufactured by Dainippon Ink Chemical), C. I. Pigment Blue 15 (Fastgen Blue B, BS: manufactured by Dainippon Ink Chemical), and so on. In containing any one of the above-mentioned pigments in the ink, it is preferred that the content of the pigment is within a range of 2 to 50% by weight.

When carbon black is used as the above-mentioned pigment, the kind of carbon black to be used is not particularly limited. However, it is preferable to use one referred to as carbon black for coloring, particularly one having a specific surface area of not less than 50 $m^2/g$ and an average particle diameter of not more than 150 nm. Specifically, it is preferable to use carbon black such as REGAL 250R or 415R (manufactured by Cabot Co.).

In treating the carbon black by irradiation of a microwave, the microwave is irradiated to the carbon black in the presence of an oxidizing agent so that a surface of the carbon black is oxidized thereby providing hydrophilic groups thereon.

When the surface of the carbon black is oxidized to provide the hydrophilic groups thereon as described above, the carbon black becomes hydrophilic by these hydrophilic groups, whereby the dispersion stability of the carbon black in an aqueous medium is improved.

In providing the hydrophilic groups on the surface of the carbon black as described above, it is preferable that a ratio (A/B) is not less than 4 letting A be an area of a portion having hydrophilic groups on a surface of the pigment and B be an area of the other portion thereon, which are respectively found by measuring infrared spectrometers of the pigment. Particularly, when the ratio A/B is not less than 5, dispersion stability of the carbon black in an aqueous medium is further improved.

Examples of an oxidizing agent used for oxidizing the surface of the carbon black in the process of irradiating the carbon black with a microwave include permanganic acid and salts thereof such as $HMnO_4$ and $(M)MnO_4$; chromic acid and related compounds thereof such as $CrO_3$, $(M)_2Cr_2O_7$, $(M)_2CrO_4$, $R_2CrO_4$, $(M)CrO_3Cl$, and $CrO_2Cl_2$; nitric acid and related compounds thereof such as $HNO_3$, $N_2O_4$, $N_2O_3$, $N_2O$, $Cu(NO_3)_2$, $Pb(NO_3)_2$, $AgNO_3$, $KNO_3$, and $NH_4NO_3$; halogens such as $F_2$, $Cl_2$, $Br_2$, and $I_2$; peroxides such as $H_2O_2$, $Na_2O_2$, $BaO_2$, and $(C_6H_5CO)_2O_2$; peroxo acids and salts thereof such as $(M)_2S_2O_8$, $(M)_2SO_5$, $HCO_3H$, $CH_3CO_3H$, $C_6H_5CO_3H$, $C_6H_4(COOH)CO_3H$, and $CF_3CO_3H$; sulfuric acid and mixture thereof such as hot concentrated sulfuric acid, and fuming sulfuric acid+ concentrated nitric acid; oxyacids and salts thereof such as $(M)ClO$, $(M)BrO$, $(M)IO$, $(M)ClO_3$, $(M)BrO_3$, $(M)IO_3$, $(M)ClO_4$, $HIO_4$, $Na_3H_2IO_6$, and $KIO_4$; metal salts such as $FeCl_3$, $CuSO_4$, $Cu(CH_3COO)_2$, $CuCl_2$, $Hg(CH_3COO)_2$, $Bi(CH_3COO)_3$, and $Pb(CH_3COO)_4$; oxygen and mixture thereof such as oxygen, and ozone; oxides such as $CeO_2$, $Ag_2O$, $CuO$, $HgO$, $PbO_2$, $Bi_2O_3$, $OsO_4$, $RuO_4$, $SeO_2$, $MnO_2$, and $As_2O_5$; nitrobenzene, iodoso compounds and so on. Particularly, it is preferable to use $H_2O_2$, $HNO_3$, $NaClO$ or $KClO$ as the oxidizing agent because they are relatively easily purified and less dangerous. In the above-mentioned formulae, (M) represents metal and R represents a hydrocarbon group.

It is to be noted here that methods for irradiating carbon black with a microwave in the presence of any one of the above-mentioned oxidizing agents above are not particularly limited. One example of such methods is that carbon black is added to an aqueous solution of an oxidizing agent and the solution is irradiated with a microwave using a household electronic microwave oven. In oxidizing the carbon black by irradiation of the microwave, a power output of the microwave is in the range of 200 to 1000 W and preferably 500 to 1000 W as described above. Further, the microwave is irradiated for 10 seconds to 100 minutes, preferably 1 minute to 30 minutes, and more preferably 1 minute to 10 minutes as described above.

In obtaining water base ink using the pigment thus treated by irradiation of a microwave as described above, the pigment is dispersed in an aqueous medium so as to make a suitable concentration.

For the aqueous medium used here for dispersing the above-mentioned pigment, water or water-soluble organic solvent is used. Examples of the water-soluble organic solvent include aliphatic alcohols having 1 to 5 carbon atoms and preferably 1 to 3 carbon atoms such as methyl alcohol, ethyl alcohol, n-propyl alcohol, and isopropyl alcohol. An amount of the water-soluble organic solvent added to the water base ink is in a range of 0.1 to 15% by weight, and preferably 1 to 6% by weight.

In order to improve properties of the water base ink, it is preferable that the above-mentioned aqueous medium further contains viscosity modifier, surface tension modifier, pH modifier, humectant, chelating agent, penetrant, antifungal agent, quick-drying agent, stabilizer, fixing agent, and so on, in addition to a colorant composed of a pigment like carbon black.

The viscosity modifier is used to adjust the ink viscosity for improved ink ejection characteristics as well as to adjust the ink penetration into a recording medium such as plain paper. Examples of a usable viscosity modifier include polyalkylene glycols such as polyethylene glycol and polypropylene glycol. Among these, particularly preferred is polyethylene glycol. When such a viscosity modifier is added to the ink, an amount of the viscosity modifier is adjusted within a range of 0 to 10% by weight, preferably 0.1 to 8% by weight, and more preferably 1 to 5% by weight.

The surface tension modifier is used to adjust the surface tension of the ink for improved ink ejection characteristics as well as to adjust the ink penetration into a recording medium. Examples of a usable surface tension modifier include nonionic surfactants, various types of surfactants such as of silicone, fluorine, acetylene, and anionic and cationic surfactants. When such a surface tension modifier is added to the ink, an amount of the surface tension modifier is adjusted within a range of 0.1 to 5% by weight, preferably 0.1 to 3% by weight, and more preferably 0.2 to 1% by weight.

The pH modifier is used for maintaining suitable pH of the ink thereby preventing the dispersion stability of a pigment from being lowered due to varied pH. Examples of a usable pH modifier include $NaHCO_3$, $Na_2B_4O_7$, $Na_2CO_3$, $KHCO_3$, $K_2CO_3$, NaOH, $CH_3COONa$, $N(CH_2CH_2OH)_3$ and the like. Among these, particularly preferred is $NaHCO_3$. When such a pH modifier is added to the ink, an amount of the pH modifier is adjusted within a range of 0.1 to 1% by weight, preferably 0.1 to 0.5% by weight, and more preferably 0.2 to 0.5% by weight.

The humectant is used for decreasing the evaporation of water as the main component of the aqueous medium thereby preventing the reduction of the ink ejection stability resulting from varied concentration, viscosity, and the like of the ink. Examples of a usable humectant include alkylene glycols such as 1,2-ethanediol, 1,2-propanediol, 1,3-propanediol, 1,2-butanediol, 1,3-butanediol, 1,4-butanediol, 2,3-butanediol, 1,5-pentanediol, 1,7-heptanediol, 2-methyl-2,4-pentanediol, 2-ethyl-1,3-hexanediol, glycerol, diethylene glycol, triethylene glycol, tetraethylene glycol, polyethylene glycol 200, dipropylene glycol, 2,2'-thiodiethanol, and 1,2,6-hexanetriol; and polyvalent-alcohol lower alkyl ethers such as 1,2-dimethoxyethane, 1,2-diethoxyethane, 1,2-dibutoxyethane, diethylene glycol dimethyl ether, diethylene glycol diethyl ether, diethylene glycol dibutyl ether, 2-methoxyethanol, 2-ethoxyethanol, 2-(methoxymethoxy) ethanol, 2-butoxyethanol, diethylene glycol monomethyl ether, diethylene glycol monoethyl ether, diethylene glycol monobutyl ether, triethylene glycol monomethyl ether, triethylene glycol monoethyl ether, 1-methoxy-2-propanol, 1-ethoxy-2-propanol, dipropylene glycol, dipropylene glycol monomethyl ether, dipropylene glycol monoethyl ether, and tripropylene glycol monomethyl ether. Among these, particularly preferred are diethylene glycol, triethylene glycol, glycerol, and the like. When such a humectant is added to the ink, an amount of the humectant is adjusted within a range of 1 to 10% by weight, preferably 3 to 10% by weight, and more preferably 5 to 8% by weight.

The chelating agent is used for trapping metal ions in the ink thereby preventing loss in the dispersion stability of carbon black. Examples of a usable chelating agent include sodium ethylenediamine tetraacetate, ethylenediamine tetraacetic acid, sodium nitrilotriacetate, sodium hydroxyethylethylenediamine triacetate, sodium diethylenetriamine pentaacetate, sodium uramil diacetate, and the like. When such a chelating agent is added to the ink, an amount of the chelating agent is adjusted within a range of 0.1 to 1% by weight, preferably 0.1 to 0.5% by weight, and more preferably 0.2 to 0.5% by weight.

The penetrant is used to enhance the ink penetration into a recording medium. Examples of a usable penetrant include polyvalent-alcohol lower alkyl ethers such as diethylene glycol monobutyl ether, and triethylene glycol monobutyl ether. When such a penetrant is added to the ink, an amount of the penetrant is adjusted within a range of 1 to 10% by weight, preferably 3 to 10% by weight and more preferably 4 to 8% by weight.

The antifungal agent is used to prevent growth of fungi or the like in the ink. Examples of a usable antifungal agent include imidazole compounds such as Thiabendazol (manufactured by Merck&Co.Inc.), Mergal (manufactured by Hoechst Inc.); isothiazoline compounds such as Proxel (manufactured by Zeneca Agrochemicals), Amolden (manufactured by Daiwa Chemical Industries); Preventol series (manufactured by Bayer Yakuhin Co.), Sodiumomazin, Dioxin, sodium dehydroacetate, water glass, and the like. When such an antifungal agent is added to the ink, an amount of the antifungal agent is adjusted within a range of 0.01 to 0.5% by weight, preferably 0.05 to 0.4% by weight, and more preferably 0.1 to 0.4% by weight.

The quick-drying agent is used for quick dry of the ink on the recording medium or quick penetration thereof into the recording medium, whereby the ink applied to the recording medium is prevented from staining other recording media. Examples of a usable quick-drying agent include lower alcohols such as methanol, ethanol, propanol, 2-propanol, and 1-butanol, 2-butanol.

The stabilizer is used for preventing loss in dispersion stability of the pigment in the aqueous medium. Examples of a usable stabilizer include alcoholamines such as monoethanolamine, diethanolamine, and triethanolamine; cyclic amide compounds such as 2-pyrrolidone, N-methyl-2-pyrrolidone, 1,3-dimethylimidazolidinone, 1,3-dimethyl-2-imidazolidinone, sulfolane, dimethylsulfoxide, and ε-caprolactam; imid compounds such as succinimid;

formamide, sorbitol, 1,3-bis(β-hydroxyethyl)urea and so on. Among these, triethanolamine may preferably be used. When such a stabilizer is added to the ink, an amount of the stabilizer is adjusted within a range of 0.1 to 1% by weight, preferably 0.1 to 0.5% by weight, and more preferably 0.2 to 0.5% by weight.

The fixing agent serves to enhance the fixing characteristics of the ink onto the recording medium. Examples of a usable fixing agent include water-soluble polyesters, polyurethanes, polyamides, polyimides, polyacrylic derivatives, polyvinylalcohols, and the like. Among these, poly(meta)acrylic esters may preferably be used. When such a fixing agent is added to the ink, an amount of the fixing agent is adjusted within a range of 0.1 to 15% by weight, preferably 1 to 10% by weight, and more preferably 4 to 8% by weight.

In the followings, pigments, water base ink and processes for producing them according to examples of the present invention will be specifically described. Further, comparative examples are given to clarify that pigments in these examples can be kept stably dispersed in aqueous media.

EXAMPLE A1

In Example A1, carbon black having an oil absorption of 48 ml/100 g (REGAL 250R: manufactured by Cabot Co.) was used as a pigment. 30 g of the above-mentioned carbon black and 100 ml of water were put into a 200 ml plastic container and mixed, after which 30 mg of glass beads each having a diameter of 2 mm was added into the plastic container. A mixture obtained was kneaded in a paint shaker (manufactured by Red Devil) for 1 hour. Then, 100 ml of 30% (by weight) aqueous hydrogen peroxide solution (extra pure reagent grade: manufactured by Wako Pure Chemicals) was put into the plastic container as an oxidizing agent, after which the mixture was agitated with a stirrer for 10 minutes, to obtain a dispersion containing the carbon black dispersed therein.

Then, 20 ml of this carbon black dispersion was put in a 100-ml sample container. A commercially available household electronic oven range (RE-CM6: manufactured by Sharp) was used as a microwave generating machine to treat the surface of the carbon black. The above-mentioned sample container was irradiated with a microwave of 2.45 GHz at a power output of 200 W for 3 minutes keeping the container uncovered. Carboxyl groups, which are hydrophilic groups, were thus provided on the surface of the carbon black.

Next, the carbon black dispersion treated with the microwave as described above was filtered through a wire net of 400 mesh and a filter of 0.2 µm to remove the above-mentioned glass beads and coarse particles. The filtrate was further purified by being desalted with the use of an ultra-filtration membrane and concentrated, to obtain a carbon black dispersion having a carbon black concentration of 20% by weight.

EXAMPLE A2

In Example A2, nothing but the oxidizing agent used in the above-mentioned Example A1 was changed. 100 ml of 30% (by weight) aqueous nitric acid solution (extra pure reagent grade: manufactured by Wako Pure Chemicals) was added as an oxidizing agent. Other treatments were carried out in the same manner as in the above-mentioned Example A1, to obtain a carbon black dispersion having a carbon black concentration of 20% by weight as well as to provide hydrophilic groups on the surface of the carbon black.

Example A3

In Example A3, nothing but the oxidizing agent used in the above-mentioned Example A1 was changed. 100 ml of 30% (by weight) aqueous sodium hypochlorite solution (extra pure reagent grade: manufactured by Wako Pure Chemicals) was added as an oxidizing agent. Other treatments were carried out in the same manner as in the above-mentioned Example A1, to obtain a carbon black dispersion having a carbon black concentration of 20% by weight as well as to provide hydrophilic groups on the surface of the carbon black.

EXAMPLE A4

In Example A4, the same oxidizing agent as that in the above-mentioned Example A1 was used. 100 ml of 30% (by weight) aqueous hydrogen peroxide solution was added as an oxidizing agent as in the above-mentioned Example A1. In Example A4, in order to enhance the reactivity of the oxidizing agent, 0.1 ml of triethylamine (extra pure reagent grade: manufactured by Wako Pure Chemicals) was further added. Other treatments were carried out in the same manner as in the above-mentioned Example A1, to obtain a carbon black dispersion having a carbon black concentration of 20% by weight as well as to provide hydrophilic groups on the surface of the carbon black.

EXAMPLES A5–A8

In each of Examples A5–A8, the same carbon black as that in the above-mentioned Example A1 was used. 30 g of the above carbon black and 100 ml of water were put into a 200 ml plastic container and mixed, after which 30 mg of glass beads each having a diameter of 2 mm was added into the plastic container. A mixture obtained was kneaded in a paint shaker (manufactured by Red Devil) for 1 hour. Then, 100 ml of 30% (by weight) aqueous sodium hypochlorite solution (extra pure reagent grade: manufactured by Wako Pure Chemicals) was put into the plastic container as an oxidizing agent, after which the mixture was agitated with a stirrer for 10 minutes, to obtain a dispersion containing the carbon black dispersed therein.

Then, in Examples A5–A8, 5 ml of the carbon black dispersions thus obtained were placed in 50-ml sample containers. The above-mentioned sample containers were respectively irradiated with a microwave of 2.45 GHz at a power output of 700 W for 1 minute in Example A5, a microwave of 2.45 GHz at a power output of 700 W for 3 minutes in Example A6, a microwave of 2.45 GHz at a power output of 700 W for 6 minutes in Example A7, a microwave of 2.45 GHz at a power output of 700 W for 9 minutes in Example A8, keeping the containers uncovered, thereby providing hydrophilic groups on the surface of each of the carbon black. Other treatments were carried out in the same manner as in the above-mentioned Example A1, to obtain each of carbon black dispersions having a carbon black concentration of 20% by weight.

Comparative Example a1

In Comparative Example a1, the same carbon black as that in the above-mentioned Example A1 was used. 30 g of the above-mentioned carbon black and 100 ml of water were put into a 200 ml plastic container and mixed, after which 30 mg of glass beads each having a diameter of 2 mm was added into the plastic container. A mixture obtained was kneaded in a paint shaker (manufactured by Red Devil) for 1 hour. Then, 100 ml of 30% (by weight) aqueous hydrogen peroxide solution (extra pure reagent grade: manufactured by Wako Pure Chemicals) was put into the plastic container as an oxidizing agent, after which the mixture was agitated with a stirrer for 10 minutes, to obtain a dispersion containing the carbon black dispersed therein.

In Comparative Example a1, the above-mentioned dispersion containing the carbon black dispersed therein was heat-treated at 90° C. for 3 hours as being agitated, to oxidize the surface of the carbon black. Other treatments were carried out in the same manner as in the above-mentioned Example A1. That is, the carbon black dispersion was filtered through a wire net of 400 mesh and a filter of 0.2 $\mu$m to remove the above-mentioned glass beads and coarse particles, and the filtrate was further purified by being desalted with the use of an ultrafiltration membrane and concentrated, to obtain a carbon black dispersion having a carbon black concentration of 20% by weight.

Comparative Example a2

In Comparative Example a2, nothing but the oxidizing agent used in the above-mentioned Comparative Example a1 was changed. In Comparative Example a2, 100 ml of 30% (by weight) aqueous nitric acid solution was added as an oxidizing agent as in the above-mentioned Example A2. Other treatments were carried out in the same manner as in the above-mentioned Comparative Example a1, to obtain a carbon black dispersion having a carbon black concentration of 20% by weight.

Comparative Example a3

In Comparative Example a3, nothing but the oxidizing agent used in the above-mentioned Comparative Example a1 was changed. In Comparative Example a3, 100 ml of 30% (by weight) aqueous sodium hypochlorite solution was added as an oxidizing agent as in the above-mentioned Examples A3 and A5–A8. Other treatments were carried out in the same manner as in the above-mentioned Comparative Example a1, to obtain a carbon black dispersion having a carbon black concentration of 20% by weight.

Comparative Example a4

In Comparative Example a4, the same oxidizing agent as that in the above-mentioned Comparative Example a1 was used. 100 ml of 30% (by weight) aqueous hydrogen peroxide solution was added as an oxidizing agent as in the above-mentioned Comparative Example a1. In Comparative Example a4, in order to enhance the reactivity of the oxidizing agent, 0.1 ml of triethylamine (extra pure reagent grade: manufactured by Wako Pure Chemicals) was further added. Other treatments were carried out in the same manner as in the above-mentioned Comparative Example a1, to obtain a carbon black dispersion having a carbon black concentration of 20% by weight.

Comparative Example a5

In Comparative Example a5, a dispersion containing carbon black dispersed therein was obtained in the same manner as that in the above-mentioned Comparative Example a1. That is, 30 g of the same carbon black as that in the above-mentioned Comparative Example a1 and 100 ml of water were put into a 200 ml plastic container and mixed, after which 30 mg of glass beads each having a diameter of 2 mm was added into the plastic container. A mixture obtained was kneaded in a paint shaker (manufactured by Red Devil) for 1 hour. Then, 100 ml of 30% (by weight) aqueous hydrogen peroxide solution (extra pure reagent grade: manufactured by Wako Pure Chemicals) was put into the plastic container as an oxidizing agent, after which the mixture was agitated with a stirrer for 10 minutes, to obtain the dispersion containing carbon black dispersed therein.

In Comparative Example a5, the dispersion containing carbon black dispersed therein was not heat-treated. The dispersion was then filtered through a wire net of 400 mesh and a filter of 0.2 $\mu$m to remove the above-mentioned glass beads and coarse particles. The filtrate was further purified by being desalted with the use of an ultrafiltration membrane and concentrated, to obtain a carbon black dispersion having a carbon black concentration of 20% by weight.

Comparative Example a6

In Comparative Example a6, the same carbon black as that in the above-mentioned Example A1 was used. 30 g of the above-mentioned carbon black and 100 ml of water were put into a 200 ml plastic container and mixed, after which 30 mg of glass beads each having a diameter of 2 mm was added into the plastic container. A mixture obtained was kneaded in a paint shaker (manufactured by Red Devil) for 1 hour. Then, 100 ml of distilled water containing no oxidizing agent was put into the plastic container, after which the mixture was agitated with a stirrer for 10 minutes, to obtain a carbon black dispersion containing the carbon black dispersed therein.

Then, the aqueous dispersion of the carbon black was filtered through a wire net of 400 mesh and a filter of 0.2 $\mu$m to remove the above-mentioned glass beads and coarse particles. The filtrate was further purified by being desalted with the use of an ultrafiltration membrane and concentrated, to obtain a carbon black dispersion having a carbon black concentration of 20% by weight.

Comparative Example a7

In Comparative Example a7, nothing but the oxidizing agent used in the above-mentioned Comparative Example a5 was changed. In Comparative Example a7, 100 ml of 30% (by weight) aqueous sodium hypochlorite solution was added as an oxidizing agent as in the above-mentioned Examples A3 and A5–A8. Other treatments were carried out in the same manner as in the above-mentioned Comparative Example a5, to obtain a carbon black dispersion having a carbon black concentration of 20% by weight.

Dispersion stability of each of the carbon black dispersions thus obtained in Examples A1–A8 and Comparative Examples a1–a7 was examined. Further, a ratio of hydrophilic groups on the surface of the carbon black dispersed in each of the carbon black dispersions was also determined. The results are together shown in the following Table 1.

The dispersion stability was evaluated in the following manner. 5 ml of the carbon black dispersions obtained in the above-mentioned Examples A1–A8 and Comparative Examples a1–a7 were respectively centrifuged at 15,000 rpm for 30 minutes using a centrifugal separator (Avanti™ J25 with a rotor JA 20.1: manufactured by BECKMAN Inc.). Subsequently, supernatant liquid of each of the carbon black dispersions thus centrifuged was taken and diluted to 10 times. Then, an absorbance of each of the diluted solutions thus obtained was determined at 600 nm. A case where the absorbance was within a range of not less than 0 to less than 1.0 was indicated by 1, a case where the absorbance was within a range of not less than 0.1 to less than 0.2 was indicated by 2, a case where the absorbance was within a range of not less than 0.2 to less than 0.3 was indicated by 3, a case where the absorbance was within a range of not less than 0.3 to less than 0.4 was indicated by 4, and a case where the absorbance was not less than 4 was indicated by 5. The results are shown in the following Table 1. When carbon black is stably dispersed in a dispersion, carbon black is also dispersed in its supernatant liquid, whereby the above-mentioned absorbance is improved. Accordingly, increase in the value of an absorbance means improvement in dispersion stability of the carbon black.

Further, in order to determine a ratio of hydrophilic groups on the surface of the carbon black dispersed in each of the carbon black dispersions, infrared spectroscopic spectrum was measured by KBr transmission method.

Specifically, 2 ml of the carbon black dispersions obtained in the above-mentioned Examples A1–A8 and Comparative Examples a1–a7 were respectively taken in laboratory dishes. Each of these laboratory dishes was put in a desiccator with silica gel and left for 24 hours as the pressure therein being decreased by an aspirator. Then, the silica gel was exchanged for new one, after which each of the dishes was left for another 24 hours to dry carbon black dispersion therein. Each of the carbon black dispersions was further vacuum-dried with a vacuum pomp for 5 hours. Subsequently, carbon black powder adhered to the wall of each dishes was scratched off with a spatula and ground into small pieces in an agate mortar, after which it was vacuum-dried with a vacuum pomp for 5 hours as being heated to 100° C. On the other hand, KBr was also vacuum-dried with a vacuum pomp for 5 hours as being heated to 100° C.

Then, the carbon black powder and the KBr thus obtained were used to prepare a pellet having a carbon black concentration of 0.3% by weight. An infrared spectroscopic spectrum of each of the pellets thus obtained was measured.

In a portion provided with carboxyl groups, which are hydrophilic groups, on a surface of the carbon black, an absorbance peak attributed to the stretching vibration of C=O is observed around wave number 1600 $cm^{-1}$. On the other hand, in a portion provided with no hydrophilic groups, an absorbance peak attributed to the graphite structure of carbon black is observed around wave number 1300 $cm^{-1}$. An integral value A of the absorbance peak around wave number 1600 $cm^{-1}$ and an integral value B of the absorbance peak around wave number 1300 $cm^{-1}$ were used to calculate the value of A/B. A case where the value of A/B was within a range of not less than 0 to less than 3.0 was indicated by 1, a case where the value of A/B was within a range of not less than 3.0 to less than 4.0 was indicated by 2, a case where the value of A/B was within a range of not less than 4.0 to less than 5.0 was indicated by 3, a case where the value of A/B was within a range of not less than 5.0 to less than 10.0 was indicated by 4, and a case where the value of A/B was not less than 10.0 was indicated by 5. The results are shown in the following Table 1. Increase in the value of A/B means increase of the hydrophilic groups provided on a surface of carbon black.

its surface, as compared with that simply dispersed in an aqueous solution of an oxidizing agent as shown in each of Comparative Examples a5 and a7 and that simply dispersed in an aqueous medium as shown in Comparative Example 6. Also, as compared with that heat-treated at 90° C. for 3 hours in an aqueous solution of an oxidizing agent as shown in each of Comparative Examples a1–a4, the carbon black as shown in each of Examples A1 to A8 was improved in dispersion stability in an aqueous medium, being provided with more hydrophilic groups on its surface. The carbon black in each of Examples A1 to A8 accomplished greater improvement in the dispersion stability in the aqueous medium by a short-time treatment with a microwave.

EXAMPLE B1

In Example B1, water base ink was produced using the carbon black dispersion prepared in the above-mentioned Example A1.

In Example B1, 500 ml of a starting mixture composed of 21.0% by weight of the carbon black dispersion in the above-mentioned Example A1, 68.3% by weight of distilled water, 2.5% by weight of diethylene glycol, 4.0% by weight of triethylene glycol, 3.0% by weight of diethylene glycol monobutyl ether, 0.3% by weight of polyethylene glycol #400, 0.4% by weight of sodium hydrogen carbonate, 0.2% by weight of tetrasodium ethylenediamine tetraacetate, 0.2% by weight of triethanolamine, and 0.1% by weight of Proxel (manufactured by Zeneca Agrochemicals) was kneaded in a paint conditioner (manufactured by Red Devil) for 10 minutes, to obtain water base ink.

EXAMPLE B2

In Example B2, water base ink was produced using the carbon black dispersion prepared in the above-mentioned Example A2.

In Example B2, 500 ml of a starting mixture composed of 21.0% by weight of the carbon black dispersion in the above-mentioned Example A2, 67.5% by weight of distilled water, 2.5% by weight of diethylene glycol, 5.0% by weight of triethylene glycol, 3.0% by weight of diethylene glycol monobutyl ether, 0.1% by weight of olefine 1010 (manufactured by Nisshin Chemical), 0.4% by weight of sodium hydrogen carbonate, 0.2% by weight of tetrasodium ethylenediamine tetraacetate, 0.1% by weight of triethanolamine, and 0.2% by weight of Proxel (manufactured by Zeneca Agrochemicals) was kneaded in a paint conditioner (manufactured by Red Devil) for 10 minutes, to obtain water base ink.

EXAMPLE B3

In Example B3, water base ink was produced using the carbon black dispersion prepared in the above-mentioned Example A3.

TABLE 1

|  | Example | | | | | | | | Comparative Example | | | | | | |
| --- | --- | --- | --- | --- | --- | --- | --- | --- | --- | --- | --- | --- | --- | --- | --- |
|  | A1 | A2 | A3 | A4 | A5 | A6 | A7 | A8 | a1 | a2 | a3 | a4 | a5 | a6 | a7 |
| dispersion stability | 3 | 3 | 4 | 3 | 3 | 5 | 3 | 3 | 2 | 2 | 2 | 2 | 1 | 1 | 1 |
| A/B | 3 | 3 | 4 | 3 | 3 | 5 | 4 | 4 | 2 | 2 | 2 | 2 | 1 | 1 | 1 |

As it can be clearly seen from the results, the carbon black irradiated with a microwave in an aqueous solution of an oxidizing agent as shown in each of Examples A1 to A8 was significantly improved in dispersion stability in an aqueous medium, being provided with more hydrophilic groups on In Example B3, 500 ml of a starting mixture composed of 21.0% by weight of the carbon black dispersion in the above-mentioned Example A3, 67.5% by weight of distilled water, 2.5% by weight of diethylene glycol, 5.0% by weight of triethylene glycol, 3.0% by weight of diethylene glycol monobutyl ether, 0.1% by weight of olefin 1010 (manufactured by Nisshin Chemical), 0.4% by weight of sodium hydrogen carbonate, 0.2% by weight of tetrasodium ethylenediamine tetraacetate, 0.1% by weight of triethanolamine, and 0.2% by weight of Proxel (manufactured by Zeneca Agrochemicals) was kneaded in a paint conditioner (manufactured by Red Devil) for 10 minutes, to obtain water base ink.

EXAMPLES B4–B7

In Examples B4–B7, water base ink was produced using the carbon black dispersions prepared in the above-mentioned Examples A5–A8. The carbon black dispersion prepared in Example A5 was used in Example B4, the carbon black dispersion prepared in Example A6 was used in Example B5, the carbon black dispersion prepared in Example A7 was used in Example B6, and the carbon black dispersion prepared in Example A8 was used in Example B7, to produce each water base ink.

In each of these Examples B4 to B7, 500 ml of a starting mixture composed of 21.0% by weight of the carbon black dispersion, 67.5% by weight of distilled water, 2.5% by weight of diethylene glycol, 5.0% by weight of triethylene glycol, 3.0% by weight of diethylene glycol monobutyl ether, 0.1% by weight of olefin 1010 (manufactured by Nisshin Chemical), 0.4% by weight of sodium hydrogen carbonate, 0.2% by weight of tetrasodium ethylenediamine tetraacetate, 0.1% by weight of triethanolamine, and 0.2% by weight of Proxel (manufactured by Zeneca Agrochemicals) was kneaded in a paint conditioner (manufactured by Red Devil) for 10 minutes, to obtain each water base ink.

Comparative Example b1

In Comparative Example b1, water base ink was produced using a carbon black dispersion prepared in the above-mentioned Comparative Example a1.

In Comparative Example b1, 500 ml of a starting mixture composed of 21.0% by weight of the carbon black dispersion described above, 68.3% by weight of distilled water, 2.5% by weight of diethylene glycol, 4.0% by weight of triethylene glycol, 3.0% by weight of diethylene glycol monobutyl ether, 0.3% by weight of polyethylene glycol #400, 0.4% by weight of sodium hydrogen carbonate, 0.2% by weight of tetrasodium ethylenediamine tetraacetate, 0.2% by weight of triethanolamine, and 0.1% by weight of Proxel (manufactured by Zeneca Agrochemicals) was kneaded in a paint conditioner (manufactured by Red Devil) for 10 minutes, to obtain water base ink.

Comparative Example b2

In Comparative Example b2, water base ink was produced using a carbon black dispersion prepared in the above-mentioned Comparative Example a2.

In Comparative Example b2, 500 ml of a starting mixture composed of 21.0% by weight of the carbon black dispersion described above, 67.5% by weight of distilled water, 2.5% by weight of diethylene glycol, 5.0% by weight of triethylene glycol, 3.0% by weight of diethylene glycol monobutyl ether, 0.1% by weight of olefine 1010 (manufactured by Nisshin Chemical), 0.4% by weight of sodium hydrogen carbonate, 0.2% by weight of tetrasodium ethylenediamine tetraacetate, 0.1% by weight of triethanolamine, and 0.2% by weight of Proxel (manufactured by Zeneca Agrochemicals) was kneaded in a paint conditioner (manufactured by Red Devil) for 10 minutes, to obtain water base ink.

Comparative Example b3

In Comparative Example b3, water base ink was produced using a carbon black dispersion prepared in the above-mentioned Comparative Example a3.

In Comparative Example b3, 500 ml of a starting mixture composed of 21.0% by weight of the carbon black dispersion described above, 67.5% by weight of distilled water, 2.5% by weight of diethylene glycol, 5.0% by weight of triethylene glycol, 3.0% by weight of diethylene glycol monobutyl ether, 0.1% by weight of olefine 1010 (manufactured by Nisshin Chemical), 0.4% by weight of sodium hydrogen carbonate, 0.2% by weight of tetrasodium ethylenediamine tetraacetate, 0.1% by weight of triethanolamine, and 0.2% by weight of Proxel (manufactured by Zeneca Agrochemicals) was kneaded in a paint conditioner (manufactured by Red Devil) for 10 minutes, to obtain water base ink.

Comparative Example b4

In Comparative Example b4, water base ink was produced using a carbon black dispersion prepared in the above-mentioned Comparative Example a4.

In Comparative Example b4, 500 ml of a starting mixture composed of 21.0% by weight of the carbon black dispersion described above, 66.3% by weight of distilled water, 2.5% by weight of diethylene glycol, 4.0% by weight of triethylene glycol, 2.0% by weight of an acrylic acid-styrene copolymer having a molecular weight of about 10,000 and containing acrylic acid and styrene in a ratio of 40:60, 3.0% by weight of diethylene glycol monobutyl ether, 0.3% by weight of polyethylene glycol #400, 0.4% by weight of sodium hydrogen carbonate, 0.2% by weight of tetrasodium ethylenediamine tetraacetate, 0.2% by weight of triethanolamine, and 0.1% by weight of Proxel (manufactured by Zeneca Agrochemicals) was kneaded in a paint conditioner (manufactured by Red Devil) for 10 minutes, to obtain water base ink.

Comparative Example b5

In Comparative Example b5, water base ink was produced using a carbon black dispersion prepared in the above-mentioned Comparative Example a5.

In Comparative Example b5, 500 ml of a starting mixture composed of 21.0% by weight of the carbon black dispersion described above, 68.3% by weight of distilled water, 2.5% by weight of diethylene glycol, 4.0% by weight of triethylene glycol, 3.0% by weight of diethylene glycol monobutyl ether, 0.3% by weight of polyethylene glycol #400, 0.4% by weight of sodium hydrogen carbonate, 0.2% by weight of tetrasodium ethylenediamine tetraacetate, 0.2% by weight of triethanolamine, and 0.1% by weight of Proxel (manufactured by Zeneca Agrochemicals) was kneaded in a paint conditioner (manufactured by Red Devil) for 10 minutes, to obtain water base ink.

Then, 5 ml of the water base ink obtained in the above-mentioned Examples B1–B7 and Comparative Examples b1–b5 were respectively centrifuged in the same manner as that in the above-mentioned carbon black dispersions. Subsequently, supernatant liquid of each of the water base ink thus centrifuged was taken and diluted to 10 times. Then, an absorbance of each of the diluted solutions thus obtained was determined at 600 nm. A case where the absorbance was within a range of not less than 0 to less than 1.0 was indicated by 1, a case where the absorbance was within a range of not less than 0.1 to less than 0.2 was indicated by 2, a case where the absorbance was within a range of not less than 0.2 to less than 0.3 was indicated by 3, a case where the absorbance was within a range of not less than 0.3 to less than 0.4 was indicated by 4, and a case where the absorbance was not less than 4 was indicated by 5. The results are shown in the following Table 2.

TABLE 2

|  | Example | | | | | | | Comparative Example | | | | |
|---|---|---|---|---|---|---|---|---|---|---|---|---|
|  | B1 | B2 | B3 | B4 | B5 | B6 | B7 | b1 | b2 | b3 | b4 | b5 |
| dispersion stability | 3 | 3 | 4 | 3 | 3 | 5 | 3 | 2 | 2 | 2 | 2 | 1 |

As it can be clearly seen from the results, in the water base ink using the carbon black dispersion in which carbon black was irradiated with a microwave in an aqueous solution of an oxidizing agent as shown in each of Examples B1 to B7, the dispersion stability of the carbon black was significantly improved, as compared with that in the water base ink using the carbon black dispersion in which the carbon black was simply dispersed in an aqueous medium as shown in each of Comparative Examples b4 and b5. Also, as compared with that in the water base ink using the carbon black dispersion in which the carbon black was heat-treated at 90° C. for 3 hours in an aqueous solution of an oxidizing agent as shown in each of Comparative Examples b1–b3, the dispersion stability of the carbon black was improved in the water base ink as shown in each of Examples B1 to B7.

The dispersion obtained by dispersing a pigment treated as shown in each of the above-mentioned Examples can be utilized in ink compositions for writing pen or recording pen, black matrices in optical filter for display, and the like, in addition to water base ink for use in ink-recording apparatus such as an inkjet printer.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A surface-treated pigment obtained by:
   providing carbon black; and
   irradiating the carbon black with a microwave under presence of an oxidizing agent.
2. The surface-treated pigment according to claim 1, wherein a power output of said microwave is in the range of 200 to 1000 W.
3. A process for producing a surface-treated pigment comprising the steps of:
   providing a pigment; and
   irradiating the pigment with a microwave under presence of an oxidizing agent.
4. The process for producing a surface-treated pigment according to claim 3, wherein
   said pigment is carbon black.
5. The process for producing a surface-treated pigment according to claim 3, wherein
   a power output of said microwave is in the range of 200 to 1000 W.
6. Water base ink containing the surface-treated pigment according to claim 1 and an aqueous medium for dispersing the surface-treated pigment therein.
7. A process for producing water base ink comprising the steps of:
   providing a pigment;
   irradiating the pigment with a microwave under presence of an oxidizing agent; and
   dispersing the pigment irradiated with the microwave in an aqueous medium.
8. The process for producing water base ink according to claim 7, wherein
   a power output of said microwave is in the range of 200 to 1000 W.
9. The process for producing water base ink according to claim 7, wherein
   said pigment is carbon black.
10. A process for producing water base ink comprising the steps of:
   providing a solution which contains a pigment and an oxidizing agent;
   irradiating the pigment in the solution with a microwave; and
   adding the pigment irradiated with the microwave to an aqueous medium.
11. The process for producing water base ink according to claim 10, wherein
   a power output of said microwave is in the range of 200 to 1000 W.
12. The process for producing water base ink according to claim 10, wherein
   said pigment is carbon black.
13. A process for producing water base ink comprising the steps of:
   providing a solution which contains a pigment and an oxidizing agent;
   irradiating the pigment in the solution with a microwave; and
   adding the solution to an aqueous medium.
14. The process for producing water base ink according to claim 13, wherein
   a power output of said microwave is in the range of 200 to 1000 W.
15. The process for producing water based ink according to claim 13, wherein
   said pigment is carbon black.
16. A surface-treated pigment including
   an area A on the surface of the pigment having hydrophilic groups, and
   another area B on the surface of the pigment without hydrophilic groups, wherein
   the ratio of area A to area B is not less than 4.
17. The surface-treated pigment according to claim 16, wherein the surface-treated pigment is obtained by providing a pigment and irradiating the pigment with a microwave under presence of an oxidizing agent.

* * * * *